(12) United States Patent
Chan et al.

(10) Patent No.: US 7,823,061 B2
(45) Date of Patent: Oct. 26, 2010

(54) SYSTEM AND METHOD FOR TEXT SEGMENTATION AND DISPLAY

(75) Inventors: Kwan-Ho Chan, Lubbock, TX (US); T. Wade Fallin, Hyde Park, UT (US)

(73) Assignee: Wizpatent Pte Ltd, Singapore (SG)

( * ) Notice: Subject to any disclaimer, the term of this patent is extended or adjusted under 35 U.S.C. 154(b) by 432 days.

(21) Appl. No.: 11/132,903

(22) Filed: May 19, 2005

(65) Prior Publication Data

US 2005/0261891 A1 Nov. 24, 2005

Related U.S. Application Data

(60) Provisional application No. 60/573,355, filed on May 20, 2004.

(51) Int. Cl.
*G06F 17/00* (2006.01)
(52) U.S. Cl. ............... 715/234; 715/700; 715/841; 715/854
(58) Field of Classification Search ............ 715/517, 715/529, 507, 526, 530, 223, 243, 255, 273, 715/854, 700, 841; 704/9; 707/104.1, 1, 707/3; 358/1.1
See application file for complete search history.

(56) References Cited

U.S. PATENT DOCUMENTS

| | | | | |
|---|---|---|---|---|
| 5,623,679 A | * | 4/1997 | Rivette et al. ............... 715/526 |
| 5,721,910 A | * | 2/1998 | Unger et al. ............... 707/100 |
| 5,754,840 A | | 5/1998 | Rivette et al. |
| 5,768,580 A | * | 6/1998 | Wical ........................ 707/102 |
| 5,774,833 A | * | 6/1998 | Newman ....................... 704/9 |
| 5,802,533 A | * | 9/1998 | Walker ....................... 715/529 |
| 5,893,109 A | * | 4/1999 | DeRose et al. ........... 707/104.1 |
| 5,991,751 A | * | 11/1999 | Rivette et al. ............. 707/102 |
| 5,991,780 A | | 11/1999 | Rivette et al. |
| 6,038,561 A | * | 3/2000 | Snyder et al. ................ 707/6 |
| 6,049,811 A | * | 4/2000 | Petruzzi et al. ............. 715/507 |
| 6,154,213 A | * | 11/2000 | Rennison et al. ............ 715/854 |
| 6,263,314 B1 | * | 7/2001 | Donner ........................ 705/1 |
| 6,263,336 B1 | | 7/2001 | Tanaka | |

(Continued)

OTHER PUBLICATIONS

Sheremetyeva, S. 2003. Natural Language Analysis of Patent Claims. In Proc. of the ACL-2003 Workshop on Patent Corpus Programming—vol. 20 Annual Meeting of ACL, pp. 66-73.*

(Continued)

*Primary Examiner*—Laurie Ries
*Assistant Examiner*—James H Blackwell
(74) *Attorney, Agent, or Firm*—Peter K. Johnson; James Larson; G. Jo Hays

(57) ABSTRACT

The present invention provides a system and method for dividing patent claims into segments for display. A segmentation engine of a computer program searches for transitional phrases or other strings and divides the patent claims into a segment for each claim. The segmentation engine also searches for dependency references. A display engine of the program uses the dependency data to display the claims in a tree structure. The segmentation also divides each claim into subsegments containing the various components of the claim. The subsegments of each claim are displayed in a tree structure nested within the tree structure of the claims. A user may manipulate and/or select segmentation rules to determine how segmentation is carried out, or may alter display settings to determine which segments or subsegments are shown and which are hidden to expedite claim analysis.

32 Claims, 14 Drawing Sheets

U.S. PATENT DOCUMENTS

| | | | |
|---|---|---|---|
| 6,289,341 B1* | 9/2001 | Barney | 707/6 |
| 6,298,327 B1* | 10/2001 | Hunter et al. | 705/1 |
| 6,434,580 B1* | 8/2002 | Takano et al. | 715/530 |
| 6,499,026 B1* | 12/2002 | Rivette et al. | 707/2 |
| 6,556,992 B1* | 4/2003 | Barney et al. | 707/6 |
| 6,564,209 B1* | 5/2003 | Dempski et al. | 707/3 |
| 6,574,645 B2* | 6/2003 | Petruzzi et al. | 715/530 |
| 6,845,485 B1* | 1/2005 | Shastri et al. | 715/530 |
| 6,981,218 B1* | 12/2005 | Nagao | 715/536 |
| 7,360,175 B2* | 4/2008 | Gardner et al. | 715/854 |
| 2002/0087326 A1* | 7/2002 | Lee et al. | 704/270.1 |
| 2003/0133135 A1* | 7/2003 | Barrett | 358/1.1 |
| 2004/0078192 A1* | 4/2004 | Poltorak | 704/9 |
| 2004/0078365 A1* | 4/2004 | Poltorak | 707/3 |
| 2005/0004806 A1* | 1/2005 | Lin et al. | 705/1 |
| 2005/0108652 A1* | 5/2005 | Beretich et al. | 715/764 |
| 2005/0234685 A1* | 10/2005 | Tanigawa | 703/2 |

OTHER PUBLICATIONS

LanA Consulting, "Patent Claim Generator, AutoPat, Version 1.1, English Edition (apparatuses) Manual," Copyright circa 2003, 37 pages.*

S. Sheremetyeva, "Towards Designing Natural Language Interfaces," Copyright Circa 2003, Springer-Verlag, pp. 477-489.*

Shinmori, Akihiro. *Can Claim Analysis Contribute toward Patent Map Generation*? Working Notes of NTCIR-4 Tokyo, Jun. 2-4, 2004.

Shinmori, Akihiro. *Patent Claim Processing for Readability*. Structure Analysis and Term Explanation, p. 1-10.

www.delphion.com (Before applicants Priority Date).

* cited by examiner

| Transitional Phrases for Independent Claims ||
| --- | --- |
| Type of Transitional Phrase | Exemplary Transitional Phrases |
| Type I – Open Ended | , xxx comprising: |
| | , xxx including: |
| | , xxx containing: |
| | , xxx characterized by: |
| | , xxx having: |
| Type II - Closed | , xxx consisting of: |
| | , xxx also composed of: |
| | , xxx being: |
| Type III – Partially closed | , xxx consisting essentially of: |

Where "xxx" represents zero or more letters or numbers

Fig. 1

| Attribute Cues Indicating the Start of an Attribute Phrase ||
|---|---|
| Type of Word or Phrase | Exemplary Attribute Cues |
| Progressive Verb | having |
| Preposition | with |
| | for |
| Others | which |
| | that |
| | wherein |
| | in which |

Fig. 2

| Transitional Phrases for Dependent Claims | |
|---|---|
| Type of Transitional Phrase | Exemplary Transitional Phrases |
| Type I<br><br>(Additional Element) | , xxx further including |
| | , xxx further comprising |
| Type II<br><br>(Restriction of an existing element) | , xxx wherein |
| | , xxx in which |

Where "xxx" represents zero or more letters or numbers

Fig. 5

| Type of Segment | Opening Tags | Closing Tags |
|---|---|---|
| Claim Number | <cn> | </cn> |
| Dependency Number | <dn> | </dn> |
| Independent Preamble | <ip> | </ip> |
| Dependent Preamble | <dp> | </dp> |
| Title Phrase | <tp> | </tp> |
| Independent Transitional Phrase | <it> | </it> |
| Dependent Transitional Phrase (additional element) | <dt> | </dt> |
| Dependent Transitional Phrase (restriction of an existing element) | <rt> | </rt> |
| Referral Phrase | <rp> | </rp> |
| Body | <bd> | </bd> |
| Element | <et> | </et> |
| Elemental | <el> | </el> |
| Attribute | <at> | </at> |
| Relational | <rl> | </rl> |
| Whereby | <wb> | </wb> |

Fig. 6

Icon List

| | State of Icon | | | Applicable to |
|---|---|---|---|---|
| | Collapsed | Expanded | Not Expandable | |
| Title Icons | ▣ | ▤ | | Title of Patent |
| Level Icons | ◐ | ♀ | ◎ | Dependency of Claim |
| Method Icons | ⊠ | ⊠ | | Independent Claim |
| Composition of Matters Icons | △ | △ | | Independent Claim |
| Apparatus Icons | ⊟ | ⊟ | | Independent Claim |
| Restriction Icons | R | R | R | Dependent Claim |
| Additional Element Icons | A | A | A | Dependent Claim |
| Elements and sub-elements Icons | ▤ | ▤ | ▤ | Element Phrase |

Fig. 9

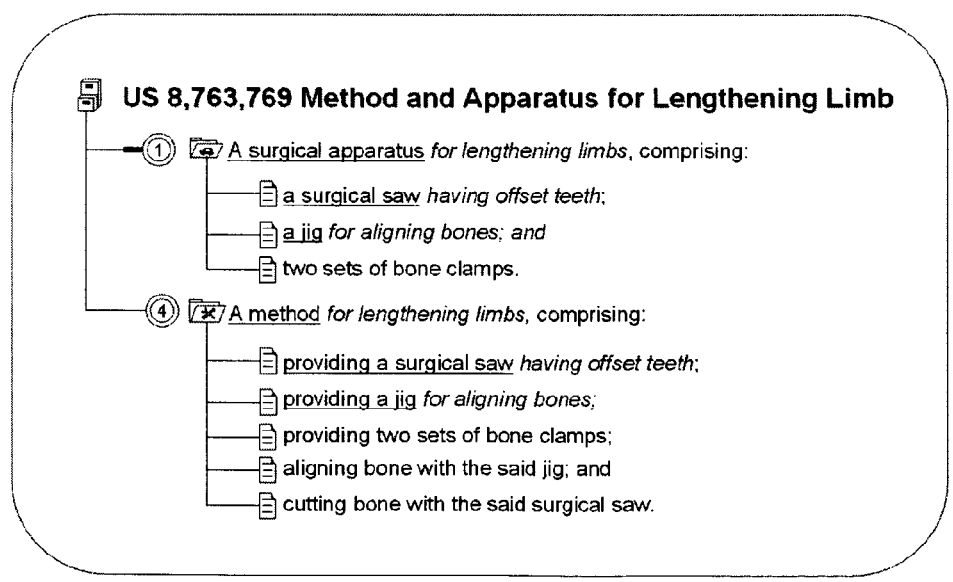

Fig. 10

SYSTEM AND METHOD FOR TEXT SEGMENTATION AND DISPLAY

CROSS-REFERENCE TO RELATED APPLICATIONS

This application claims the benefit of the following:

U.S. Application No. 60/573,355, filed May 20, 2004, and is entitled METHOD OF SENTENCE SEGMENTATION AND DISPLAY OF SEGMENTED TEXT FOR IMPROVED READABILITY AND ANALYSIS.

The foregoing application is incorporated herein by reference.

BACKGROUND OF THE INVENTION

1. The Field of the Invention

The present invention relates to parsing of text information for readability and analysis, and more particularly relates to the segmentation and display of patent claim text for readability and analysis.

2. The Relevant Technology

Review of issued patents and published patent applications are essential steps in the preparation of new patent applications and in the development of new products. Prior to the availability of personal computers and the Internet, such reviews were done with paper copies of the relevant patent documents. As such, there was a practical limit to the number documents that can be reviewed at any one time. However, with the advent of high performance personal computers with advanced word processing software and the ubiquitous availability of Internet access, large numbers of relevant documents can be retrieved with ease. The improvement in technology has paradoxically made the review of patents a more difficult task mainly due to the large volume of materials retrieved. This is particularly difficult for engineers and product development managers who are unfamiliar with the arcane and highly structured language of patent documents. There exists a need for a method to enable a large number of documents to be analyzed rapidly and converted into a form that is more easily digested by a reader, particularly a reader that is not familiar with terminology specific to patent claims. Such a method should preferably be rapidly executable, and therefore must not be too computationally intensive. Further, there exists a need for a method of displaying the results of the analysis in a manner that facilitates rapid understanding and, where desired, more in-depth analysis.

BRIEF DESCRIPTION OF THE DRAWINGS

FIG. 1 is a table listing the subtypes of transitional phrase for independent claims, including examples of each subtype. Additional definitions can be added to the list in FIG. 1 should it be deemed necessary in the future.

FIG. 2 is a non-exhaustive listing of types of attribute cues for identification of the start of an attribute phrase within a preamble phrase of an independent claim or within an element phrase of an independent or dependent claim, including examples of attribute cues for each type. Additional definitions can be added to the list in FIG. 2 should it be deemed necessary in the future.

FIG. 5 is a table listing the types of dependent transitional phrases for dependent claims, including examples for dependent transitional phrases of each type. Additional definitions can be added to the list in FIG. 5 should it be deemed necessary in the future.

FIG. 6 is a table showing the opening and closing tags for each type of segment. Additional types of segments can be added to the list in FIG. 6 should it be deemed necessary in the future.

FIG. 9 shows eight classes of icons in which each class of icon is to indicate the type of text that follows the icon.

FIG. 10 is a schematic representation of a computer screen showing the two independent claims and the elements associated with each of the independent claim.

DETAILED DESCRIPTION OF THE INVENTION

Figure 3:
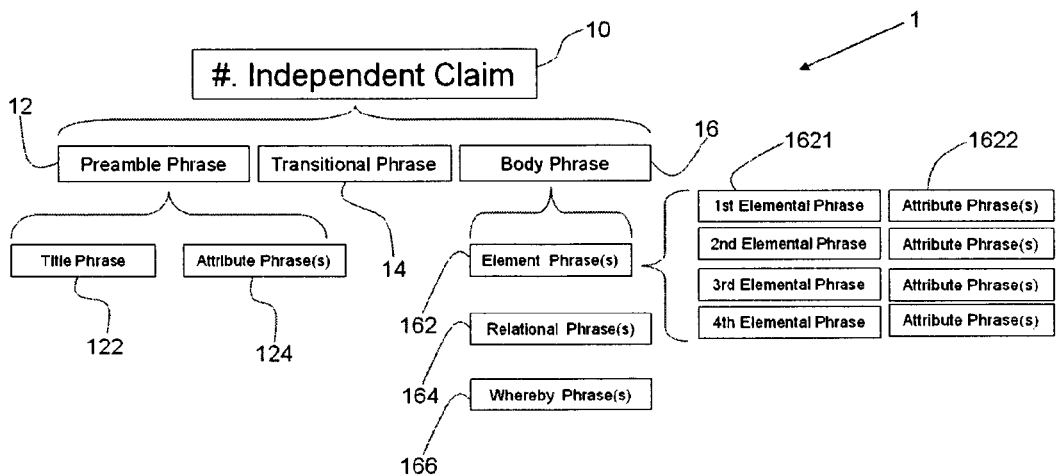
FIG. 3 is a schematic representation of the segmentation of an independent claim into non-overlapping segments.

The present invention provides a method for user selectable compression and decompression of text documents for improved readability and analysis. One method of achieving this is to divide sentences into syntactically correlated non-overlapping segments. A subset of a body of text is defined as a "segment," and may include one or more words and/or punctuations such as colons, semicolons, or periods. The segments are amenable to display as chunks of text in accordance with a predetermined set of rules including rules that allow the user to selectively display or hide all or part of a segment in an interactive manner. "Extraction" of a segment refers to separation of the segment from other text.

The present invention includes a method for the segmentation of a sentence into segments and may include further segmentation of the segments. The hierarchal segmentation of text can proceed to a predetermined number of levels. The segmentations are carried out in accordance with a set of prescribed rules. The segments are then tagged in accordance with the type and hierarchal level of the segmentation. After completion of the segmentation of one sentence, the next sentence is checked to determine if it refers to previous sentence(s) in a dependent relationship. If such a dependency relationship exists then the phrase referring to such a relationship is segmented and tagged in a prescribed manner. In this application, a "phrase" may include one or more words and/or punctuations such as colons, semicolons, or periods.

The tagged sentences can then be displayed in accordance with a structured set of rules for ease of readability, comprehension and analysis. One mode of display is to present the segments in a prescribed hierarchal schema, such as a tree structure, on a computer screen. By way of example, the segmented sentence can be displayed in a compressed form with certain predetermined segments hidden. For ease of reading and comprehension, the segments can be displayed in a hierarchal fashion in accordance with a set of predetermined rules. In this application, the term "display" relates to any method of presenting information for visual assimilation by a user. A "hierarchal schema" is any display arrangement that indicates a hierarchy between multiple segments.

The hidden segment can be revealed on demand by the user. For display on a computer screen, one method of revealing the hidden segment is to hover the cursor over a related segment and after a predetermined length of time, typically one or two seconds, the hidden segment would appear. The previously hidden segment can be hidden again once the cursor moves away from the related segment. Another method of revealing the hidden segment is to move the cursor over a related segment (or a corresponding icon) and click on the computer mouse. The revealed hidden text in this case remains visible until it is selected by user to be hidden by such action as placing cursor over a predetermined location and clicking the computer mouse.

In one embodiment, the rules for display are based on tags used to delineate the segments. The tags for the segments themselves are not usually displayed. The display system is such that the text is displayed in a user compressible-decompressible form. The degree of compression and decompression for display is governed by a predetermined set of display rules embedded in computer codes. The degree of compression and decompression can also be determined by the end user in an interactive manner. Certain default display rules can be instituted when a page is first displayed on the computer screen. By way of example, a display rule can be incorporated in which only the independent claims are displayed on an output device (such as a computer screen) when displaying the page for claim text for the first time.

In one embodiment of the invention, a text segmentation engine first processes the supplied text in accordance with a prescribed algorithm. By way of an example, the algorithm segments the text into segments using cue phrases, part-of-speech tagging, or other suitable methods of text chunking. The segments are then tagged using a predetermined tagging scheme. In a secondary process, a display engine takes the processed text with the tagged segments and displays on the computer screen or other suitable output the segments in accordance with a prescribed display algorithm. In this embodiment the rules for segmentation of the text can be implemented independently of the rules for display. Thus, rules and techniques for text segmentation can be changed and refined without affecting the user's display selections, and vice versa.

One specific embodiment of the method is highly suited for rapid analysis of patent claims in which the language has a predetermined and a highly predictable structure. Each claim starts with a numeral label which is an Arabic numeral followed immediately by a period. The text of the claim itself is separated from the period by a space. A claim which does not refer to another claim for the purpose of inheriting all the characteristics of the referred claim is an independent claim. Each independent claim consists of one sentence that includes a preamble, a transitional phrase, and a body. The preamble is generally the first part of the claim sentence, and typically ends with a comma. After the comma, the transitional phrase is presented; the transitional phrase typically ends with a colon. After the colon, the remainder of the sentence is the body, which typically ends with a period.

Examples of transitional phrases for independent claims are shown in FIG. 1. The preamble can be further segmented into a title phrase and an attribute phrase. The body of an independent claim comprises a list of elements such as the ingredients of a composition of matter, or the parts of an apparatus. These phrase segments listing the elements are called "element phrases" and are separated from each other by a semi-colon. The last element phrase is separated from the penultimate element phrase by a semicolon ";" and the word "and."

Each element phrase can be further segmented into an elemental phrase and one or more attribute phrases. FIG. 2 lists some types of words or phrases that may signal the beginning of an attribute phrase. The attribute phrase usually starts with a progressive verb (e.g. having), a preposition (e.g. with, for), or with words like "which," "that," "wherein" and "in which." The body of an independent claim may also contain two other classes of segments.

In addition to the element phrases, the body of an independent claim may also contain one or more of a second type of segment called relational phrases. A relational phrase states the relationship between two or more elements. The third type of segment in the body of an independent claim or dependent claim is the whereby phrase that states the function of the claimed method or apparatus. The whereby phrase is usually located at the end of the claim. FIG. 3 schematically depicts the structure of an independent claim in accordance with one method of segmentation of the invention.

Figure 4:
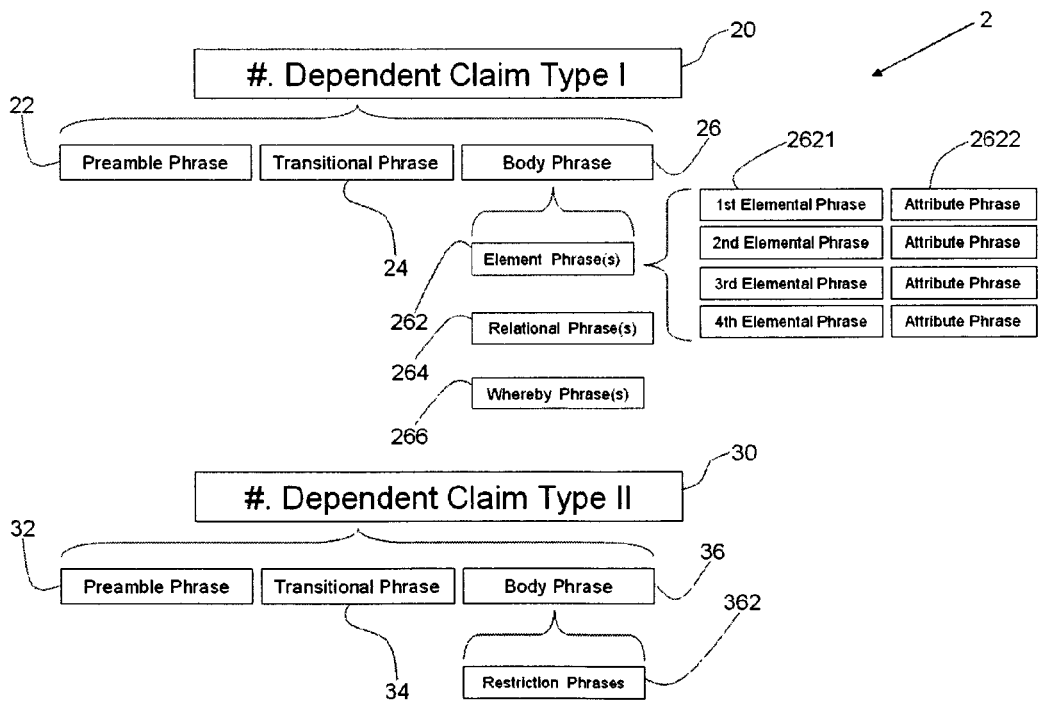
FIG. 4 is a schematic representation of the segmentation of the two types of dependent claims as defined in FIG. 5, into non-overlapping segments.

A dependent claim contains a reference to a claim previously set forth and then specifies a further limitation of the subject matter claimed and incorporate by reference all the limitations of the claim to which it refers. FIG. 4 schematically depicts the structure of a dependent claim in accordance with one segmentation method of the invention. As in the independent claim, the dependent claim of FIG. 4 comprises a preamble, a transitional phrase, and a body. The reference to a claim previously set forth is contained in the preamble of the dependent claim. The preamble of a dependent claim can be segmented into a title phrase and one or more attribute phrases associated with this title phrase. For the case of the preamble of a dependent claim there is a special type of attribute phrase called a referral phrase in which reference is made to a claim previously set forth. Within this referral phrase, a segment called the dependency number referred to in FIG. 6 can be extracted and tagged with the opening tag <dn> and a closing tag </dn>. The dependency number is typically the claim number of the base claim.

FIG. 5 illustrates some types of transitional phrases that may be used to signal the beginning of a new element or a restriction of an existing element within a dependent claim. There are two types of dependent claims that differ from each other in the way the claim is narrowed. In the first type, the claim is narrowed by including one or more additional elements. In a manner similar to the body of the independent claim, the body of the dependent claim can be segmented into element phrases, relational phrases and whereby phrases. The transitional phrase for this first type of claim is typically "further including" or "further comprising."

In the second type of dependent claim, the claim is narrowed by restriction of an element previously set forth. The transitional phrase for this second type of dependent claim is typically "wherein" or "in which." The body of this second type of dependent claim can be segmented into one or more restriction phrases. A claim may also include an additional element along with a separate phrase that provides a restriction of that element or of any element previously set forth.

There are a number of ways to carry out the sentence segmentation. Claim text having a highly prescribed structure is amenable to rule based segmentation. The boundaries of the various segments can be based on a series of rules using cue phrases, key words and punctuations. This can further be refined with natural language processing technique such as part-of-speech tagging and parsing using context-free grammars. Other methods of text chunking well known in the art of natural language processing may also be used.

For the purpose of illustration, the following is a fictitious set of claims from a fictitious patent numbered U.S. Pat. No. 8,763,769 and titled "Method and Apparatus for Lengthening Limbs:"

1. A surgical apparatus for lengthening limbs, comprising:
a surgical saw having offset teeth;
a jig for aligning bones; and
two sets of bone clamps.

2. A surgical apparatus for lengthening limbs in accordance with claim 1, further including a reciprocating drive means for driving the said surgical saw.

3. A surgical apparatus for lengthening limbs in accordance with claim 2, wherein the reciprocating drive means is a sprocket chain.

4. A method for lengthening limbs, comprising:
providing a surgical saw having offset teeth;
providing a jig for aligning bones;
providing two sets of bone clamps;
aligning bones with the said jig; and
cutting bone with the said surgical saw.

According to one segmentation method, the segments are identified with tags that are embedded into the claim text to indicate the opening and closing (i.e., beginning and ending) of each segment. Each tag consists of an identifier surrounded by angle brackets < >. For example, the tag that identifies a title phrase is "<tp>." Most segments can be identified unambiguously by using the same tags at the start and end of a segment as in "<tp>this is a title phrase<tp>." FIG. 6 illustrates one tagging convention that may be used according to the invention. After tagging via the tagging convention of FIG. 6, using only the opening tag at the start and at the end of each segment, the first two claims of the '769 patent would appear as follows:

<cn>1.<cn><ip><tp> A surgical apparatus<tp><at> for lengthening limbs<at><ip><it>, comprising:<it>
<et><el>a surgical saw<el><at> having offset teeth;<at><et>
<et><el>a jig<el><at> for aligning bones;<at><et>
<et> and two sets of bone clamp.<et>
<cn>2.<cn><dp><tl> A surgical apparatus<tl><at> for lengthening limbs <at><rp> in accordance with claim <dn>1<dn><rp><dp><dt>, further including<dt><et><el>a reciprocating drive means<el><at> for driving the said surgical saw.<at><et>

For the purpose of avoiding ambiguity and for consistency with HTML (HyperText Markup Language) and XML (eXtensible Markup Language), the closing tag may optionally be distinguished from the opening tag with a forward slash (/), as shown in FIG. 6. One example of this is as follows: "<tp>this is a title phrase</tp>." Thus, the first two exemplary claims, as tagged with an HTML and XML compatible tagging convention, become:

<cn>1.</cn><ip><tp> A surgical apparatus</tp><at> for lengthening limbs</at></ip><it>, comprising:</it>
<et><el>a surgical saw</el><at> having offset teeth;</at></et>
<et><el>a jig</el><at> for aligning bones;</at></et>
<et> and two sets of bone clamp.</et>
<cn>2.</cn><dp><tl> A surgical apparatus</tl><at> for lengthening limbs </at><rp> in accordance with claim <dn>1</dn></rp></dp><dt>, further including</dt><et><el> a reciprocating drive means</el><at> for driving the said surgical saw.</at></et>

The tagging is done in accordance with a set of predetermined rules to delineate the boundaries of each type of segment. There are a number of ways to segment a claim into the predetermined type of segments using a combination of rules and natural language processing techniques. One method of segmenting a claim sentence is to associate the start and end of the predetermined segment with a predetermined set of cue word(s), cue phrase(s) or punctuation(s).

Another method of segmenting a claim sentence is to predefine a set of phrases as the putative segment. For example, for an independent claim, a computer program can be coded such that when any of the defined phrases (FIG. 1) associated with a transitional phrase 14 of an independent claim (FIG. 3) is found, that portion of the sentence will be tagged with the opening tag <it> and the closing tag </it>. The segment of the sentence preceding the independent transitional phrase 14 is a preamble phrase 12 in FIG. 3 and the segment of the sentence after the independent transitional phrase 14 is a body phrase 16. The preamble phrase 12 and the body phrase 16 may then be tagged accordingly.

Yet another method of segmenting a claim sentence is to first perform part-of-speech tagging of the claim sentence using any of the techniques well-known in the art of natural language processing. Based on a predetermined series of rules, the part-of-speech tagging is used to segment the claim into the various segments shown in FIG. 3 for an independent claim, or in FIG. 4 for a dependent claim.

For any given tag, new rules can be added if experience shows that for a certain segment, the new rules such as new cue words or cue phrases can be used to better identify the segment. For example, the tag <rp> is used to tag a segment called a referral phrase in the dependent claim whenever the phrase "in accordance with claim #" appears, where # represents the number of the base claim. If, at a later stage, it is determined that the phrase "according to claim #" is also commonly used to represent a referral phrase, additional codes in the computer program can be implemented such that when there is a match for the phrase "according to claim #," the beginning and end of this segment of the sentence will be tagged with an opening tag <rp> and a closing tag </rp>, respectively. This allows for rules to dynamic change, and for new rules to be added for improved tagging of the different segments. Rules may be changed or added via user intervention, or automatically by the software in response to learning methods such as text analysis or tracking segmentation commands made by the user.

Figure 7:
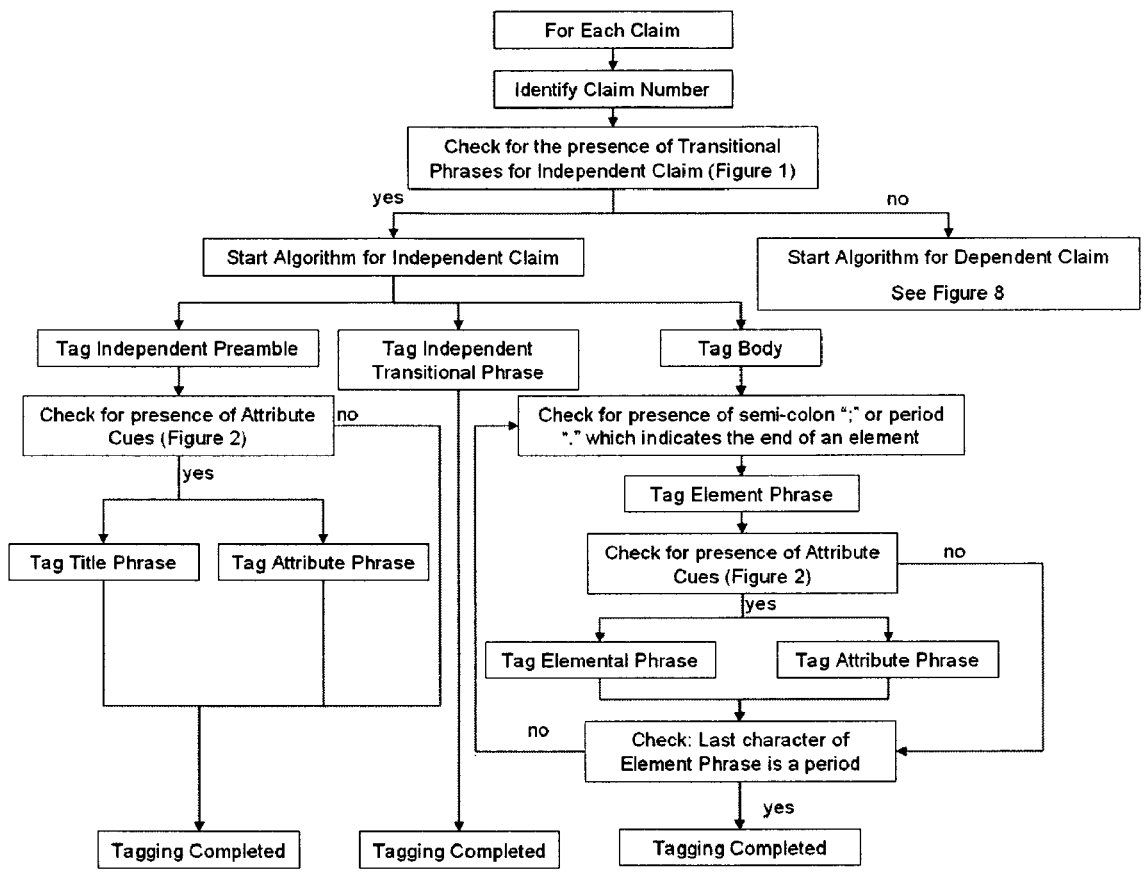
FIG. 7 is a flow chart depicting the steps for identification of an independent claim, and generating and tagging segments for the identified independent claim.
Figure 8:
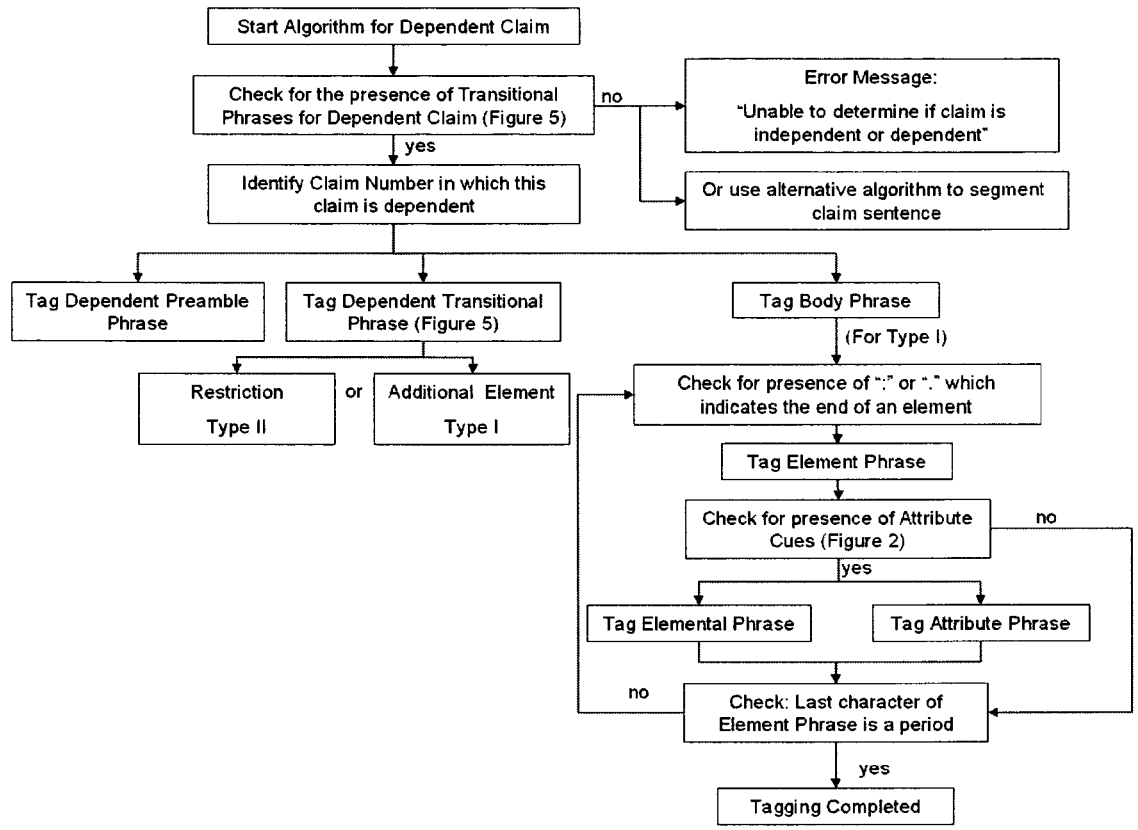
FIG. 8 is a flow chart depicting the steps for generating and tagging segments for the identified dependent claims.

A wide variety of different segmentation and tagging methods may be used according to the invention. By way of example, FIGS. 7 and 8 are flow charts illustrating methods of segmentation and tagging of independent and dependent claims, respectively. In one embodiment of the invention, the input text for a patent specification, including the text of the claims, is first processed by the computer program to extract the section of text containing the claims. In accordance with the algorithm depicted in FIG. 7, each claim sentence is identified by the claim number and the claim sentence is checked to determine whether the claim sentence contains a transitional phrase 14 for an independent claim, as listed in FIG. 1.

If the claim sentence contains a transitional phrase 14 for an independent claim, the algorithm for segmenting the sentence into the preamble phrase 12, the transitional phrase 14, and the body phrase 16 is then initiated. The preamble phrase 12 is segmented into a title phrase 122 and one or more attribute phrases 124. The body phrase 16 is segmented into one or more element phrases 162. Standard drafting convention requires a positive recitation of each element of a claim. This necessitates the use of a semicolon to separate the elements of a claim. Each resulting element phrase 162 is segmented into one or more elemental phrase(s) 1621 and associated attribute phrases 1622. One or more attribute phrases 1622 can be associated with any given elemental phrase 1621. The start of an attribute phrase 1622 is identified by transitional phrases including those listed in FIG. 2, and often contains progressive verbs or prepositions. The body phrase 16 may further be segmented by the algorithm to identify one or more relational phrases 164 and whereby phrases 166.

The relational phrase 164 may include one or more opening cue words such as "wherein" or "in which." In addition, the relational phrase 164 typically includes two or more antecedent elements and one or more words defining a relationship between the antecedent elements. The word(s) defining the relationship between the antecedent elements often indicate a spatial or temporal relationship. Prepositions such as "on," "under," "over," "near," "by," "at," "from," "to" and "with," and words such as "through," "aligned," "on top" and "after" are examples of words that define the relationship between the antecedent elements. Each of the whereby phrases 166 typically has an opening cue phrase "whereby." Each of the relational phrases 164 and the whereby phrases 166 is terminated by a semicolon or a period.

In this application, a "substantive claim limitation" is a word or phrase of a claim that, in some manner, recites a limitation to the invention. Accordingly, a recitation of claim dependency or the like is not a "substantive claim limitation." The attribute phrases 1622, relational phrases 164, and whereby phrases 166 of the body phrase 16 may all be or contain substantive claim limitations. Under certain circumstances, the attribute phrase(s) 124 of the preamble phrase 12 may also be or contain one or more substantive claim limitations.

If the claim sentence does not contain a transitional phrase that matches a predefined set of putative transitional phrases for an independent claim, as shown in FIG. 1, an algorithm depicted in FIG. 8 is then initiated to segment and tag the dependent claim. In accordance with this algorithm, the claim sentence is first checked to determine whether there is a match for any of the predefined dependent transitional phrases listed in FIG. 5. If there is no match, then an error message is issued to notify the end user that it is not possible to determine whether the claim sentence is independent or dependent. Alternatively, if there is no match for any of the predefined dependent transitional phrases, another set of algorithms can be used to segment this claim sentence, possibly using other more computationally intensive technique such as machine learning techniques, or through the guidance of the user.

Once it is confirmed that there is a match for any of the predefined dependent transitional phrases as listed in FIG. 5, the algorithm identifies the claim number from which the claim depends. Alternatively, as previous described, the claim dependency number can be extracted after identification of the preamble and referral phrase. This establishes the dependency of the claim and the information will be used by the display engine 44 to construct a hierarchical schema for display, according to a predetermined set of rules. Identification and tagging of the dependent transitional phrase allows for the dependent claim to be segmented into a preamble phrase 22 that immediately precedes a transitional phrase 24, and a body phrase 26 that immediately follows the transitional phrase 24.

The dependent claim can be identified as a Type I dependent claim, in which one or more new elements of the invention are recited, or as a Type II dependent claim, in which one or more further restrictions of one or more existing elements are recited. For a Type I dependent claim, the body phrase 26 is further segmented into one or more element phrases 262, which, themselves can be further segmented into one or more elemental phrases 2621 and associated attribute phrases 2622. The body phrase 26 may further be segmented by the algorithm to identify one or more relational phrases 264 and whereby phrases 266. For a Type II dependent claim, the body phrase 26 may be further segmented to identify one or more restriction phrases 362. The element phrases 262, relational phrases 264, whereby phrases 266, and restriction phrases 362 may all be or contain substantive claim limitations, as defined previously.

Once all the claims have been segmented, the segments may be displayed to a user in a manner that makes the structure of each claim, as well as the overall structure of the application claims, relatively easy to understand. Certain segments may be shown or hidden depending on user preferences and/or default display settings. Visual cues, or "visual indicators," may be provided to indicate that certain claims or segments are hidden. For the purpose of display on a computer screen, these visual indicators can be in the form of icons, a change in shape or color of the display cursor or special formatting of text, such as different fonts or text colors.

FIG. 9 shows eight classes of icons in which each type of icon indicates the type of segment that follows the icon. Within each class of icon, the icons can be in one of three states, namely collapsed, expanded and not expandable. All icons within each class have a common graphic or alphanumeric symbol identifying the class to which the icon belongs. For example, the level icon (the spyglass with a number) has the claim number embedded in the icon. In the icons for the dependent claims, the letters "R" and "A" indicate a restriction of an existing element and an additional element, respectively.

In one embodiment of the invention, the tagged claims can be displayed on a computer screen in a compressed form at a level of compression selectable by the user or predetermined by the computer program as the default display when the software is initiated. For example, FIG. 10 shows the initial display of the set of claims mentioned previously from the fictitious U.S. Pat. No. 8,763,769. It may be advantageous to review the independent claim first, particularly for claim sets having a large number of claims. Accordingly, in FIG. 10, the user has elected to initially display only the independent claims and the associated elements.

Figure 11:
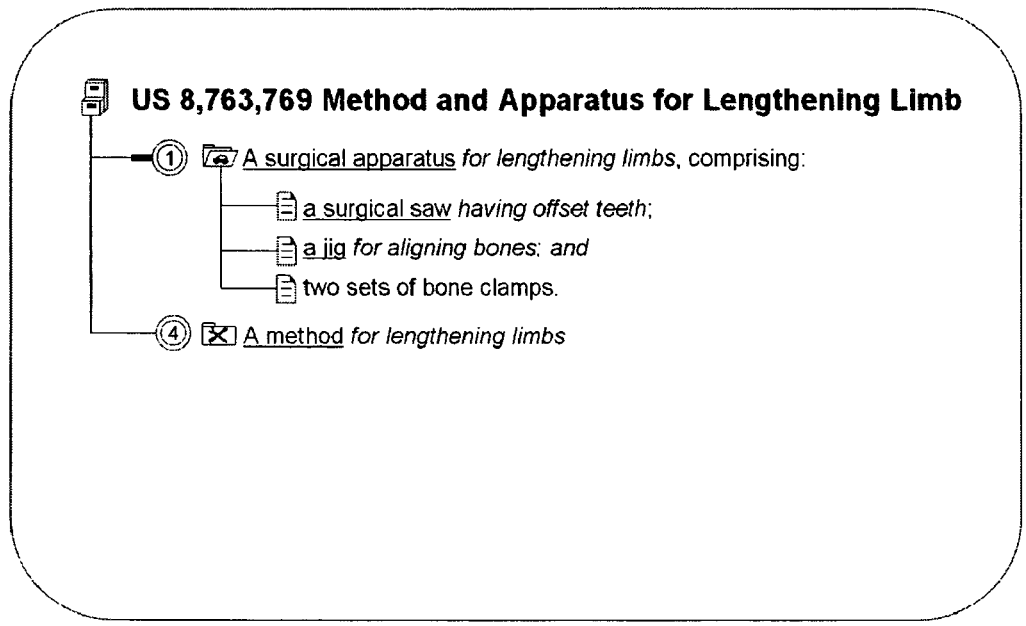
FIG. 11 is a schematic representation of a computer screen showing the two independent claims and the elements associated with the first independent claim. The elements of claim 4 have been hidden in response to clicking of the icon for the method claim with the computer mouse.

The user can choose to compress the independent claim by hiding the elements. According to one example, this can be done by positioning the cursor over the expanded apparatus icon of independent claim 4 and clicking the expanded apparatus icon with the computer mouse. This will cause all the elements associated with claim 4 to be hidden from view, as depicted in FIG. 11. The expanded apparatus icon has now been replaced with a collapsed apparatus icon, as shown in FIG. 11. If, on initial review, it is desired that the dependent claim of claim 1 be shown, the user can select the level icon of claim 1 and click on the computer mouse.

Figure 12:
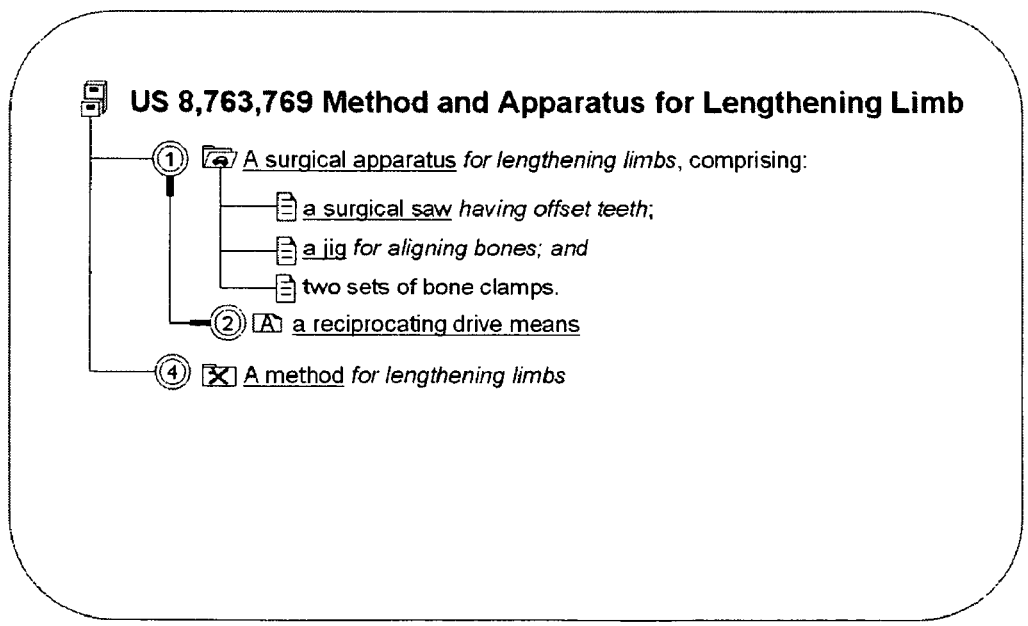
FIG. 12 is a schematic representation of a computer screen showing, in addition to the two independent claims shown in FIG. 11, claim 2, which depends from claim 1. Claim 2 is shown in response to clicking of the icon for claim 1 in FIG. 11 with the computer mouse. The phrase "a reciprocating drive means" is underlined as a visual cue to indicate that there are one or more hidden segments associated with this segment.
Figure 13:
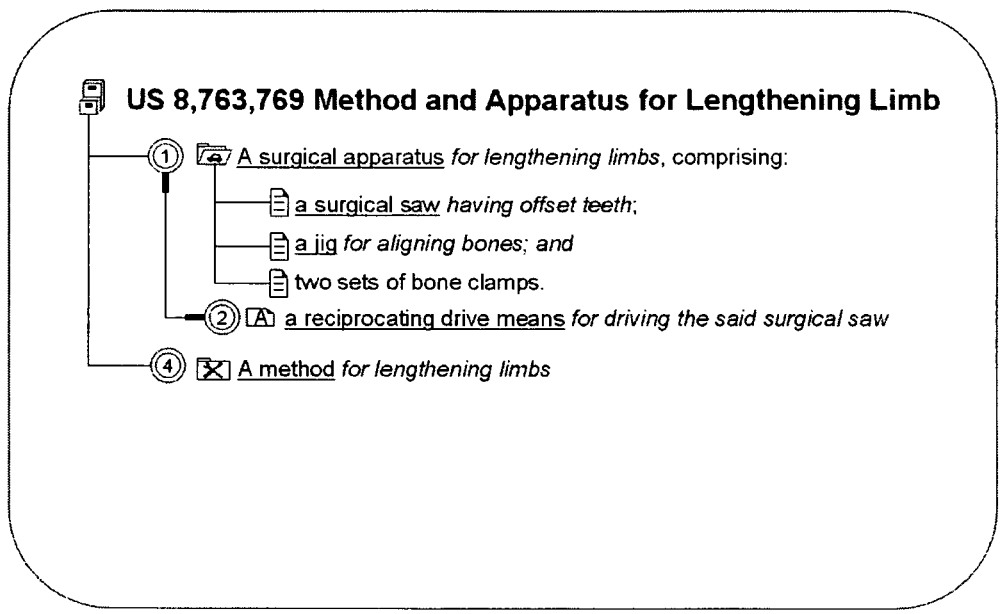
FIG. 13 a schematic representation of a computer screen in which the attribute of the additional element in claim 2 is displayed. The attribute is displayed in response to clicking of the underlined text "a reciprocating drive means" of claim 2 in FIG. 12 with the computer mouse.

As shown in FIG. 12, claim 2 is displayed in a compressed form, with only the elemental phrase shown. The collapsed additional element icon indicates that this is an additional element. The elemental phrase "a reciprocating drive means" is underlined indicating that there is an associated attribute phrase. The associated attribute phrase can be displayed by moving the cursor over this phrase and clicking the computer mouse; the result is shown in FIG. 13. Note that for the dependent claim, the preamble and the dependent transitional phrase are not shown.

Figure 14:
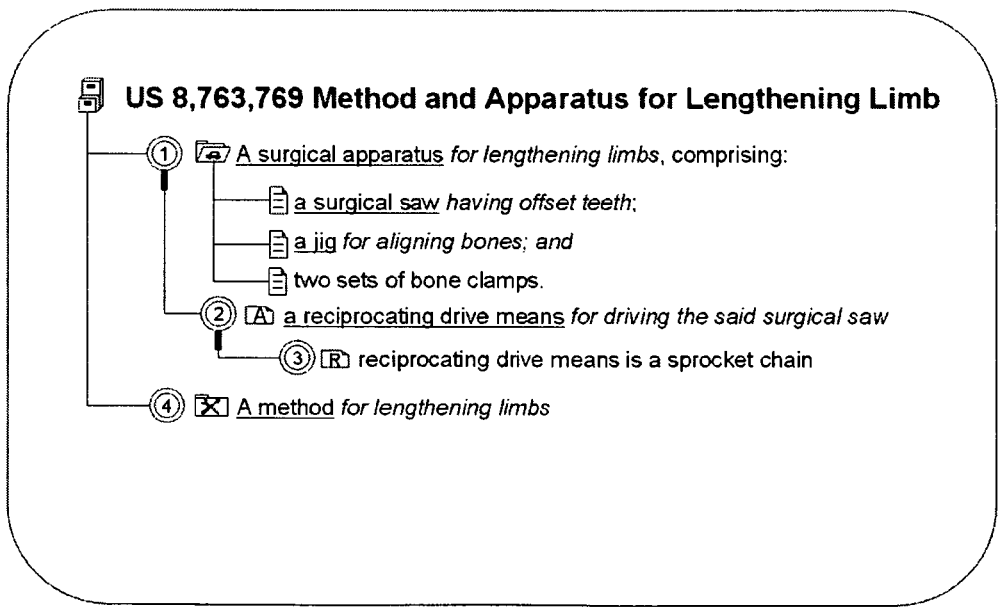
FIG. 14 is a schematic representation of a computer screen showing claim 3, which depends from claim 2. Claim 3 is displayed in response to clicking of the icon for claim 2 in FIG. 13 with the computer mouse.

The level icon for claim 2 indicates that claim 2 has one or more dependent claims. By moving the cursor over this icon and click on the computer mouse, claim 3 is displayed, as shown in FIG. 14. Again, the preamble and the dependent transitional phrase of claim 3 are not shown. The collapsed restriction icon indicates that this dependent claim is a restriction to an existing, previously recited element.

Figure 15:
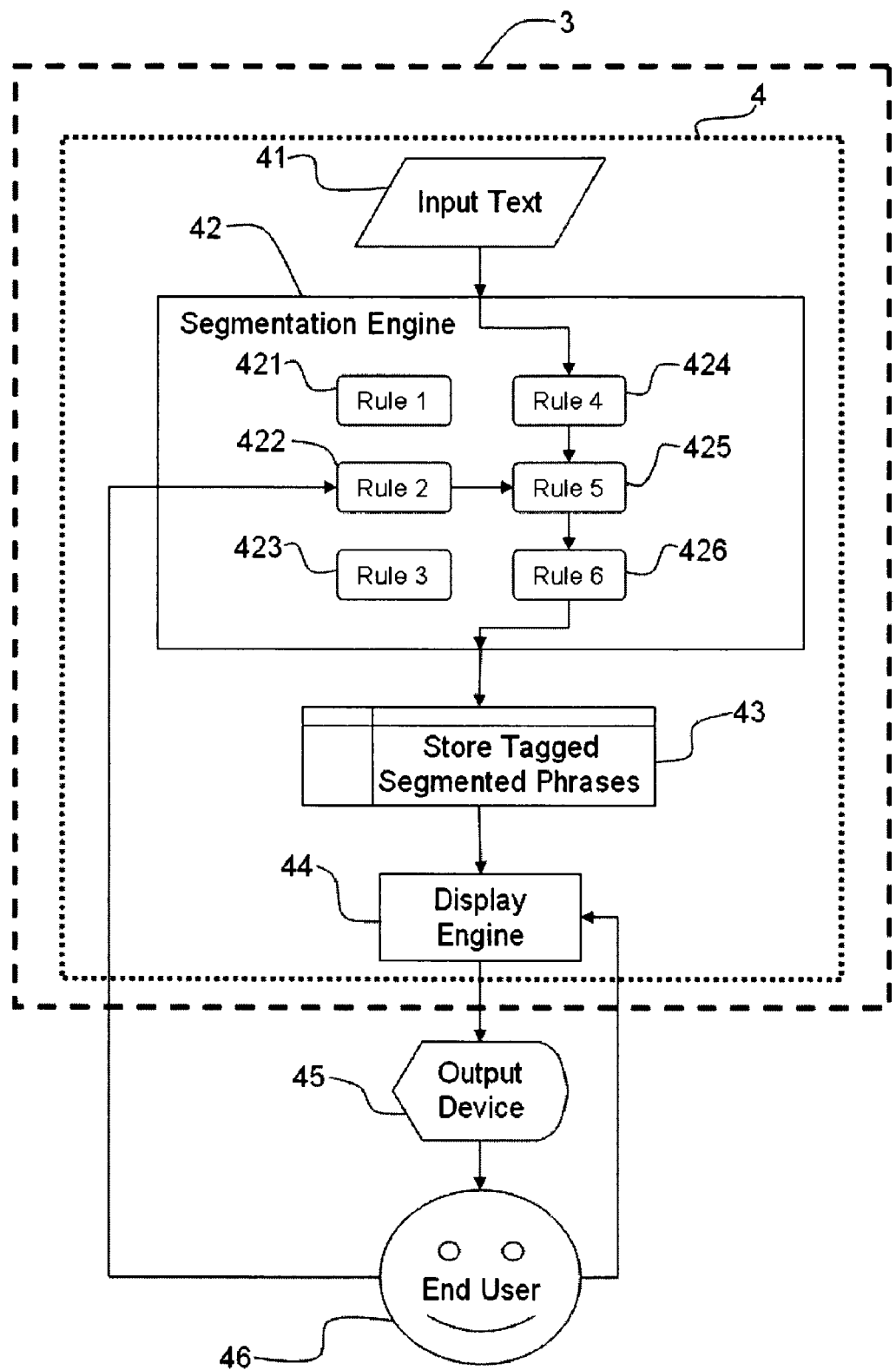
FIG. 15 is a schematic block diagram that depicts a computer program for text segmentation and display of segmented text in an interactive manner with an end user.

FIG. 15 is a schematic block diagram that depicts the general organization of a computer program 4 for segmenting claim text and displaying them in a user compressible and decompressing form. The computer program 4 may reside in a computer readable medium 3 such as a hard drive, operating RAM, ROM, Flash RAM, writable CD or DVD, floppy disk, or the like.

The segmentation engine 42 and the display engine 44 comprise computer algorithms for segmenting text and for displaying the segments, respectively, in accordance with a predetermined set of rules. Input text 41 containing the claim text is segmented into non-overlapping segments by the segmentation engine 42. The segmentation engine 42 includes a plurality of segmentation rules 421, 422, 423, 424, 425, 426. Not all of the segmentation rules 421, 422, 423, 424, 425, 426 are used at any one time. For the purpose of illustration, FIG. 15 shows that rule 4 (424), rule 5 (425) and rule 6 (426) are used in segmenting the input text 41. The output of the segmentation engine 42 includes segments with the appropriate tags as listed in FIG. 6. Other identifiers such as the version of the segmentation engine 42 and the subset of rules implemented may also be included in the output.

The output of the segmentation engine 42 is stored in a storage device 43, which may be the computer readable medium 3 or a different storage device. This allows for rapid retrieval of the tagged segments to be displayed by the display engine 44 and also avoids the need to repeat the segmentation of the input text in the event that repeated display is carried out, as when the display settings are changed. The output of the display engine 44 is transferred to any suitable output device 45. In general it is most convenient to display the output of the display engine 44 on a computer screen.

The end user 46, on reviewing the output of the display engine 44, may issue instructions to the display engine 44 to modify the output. As the segmented claim text can be displayed in a hierarchal format, the end user 46 may issue a command to the display engine 44 to suppress the display of certain segments for readability. If the end user 46 is desirous of more information regarding certain portions of the claims, he or she may issue a command to the display engine 44 to display one or more previously hidden segments. The issue of a command to the display engine 44 is most conveniently achieved by positioning the curser at a predetermined location and clicking the mouse.

The segmentation method followed by the segmentation engine 42 depends on a predetermined set of rules, such as the rules 424, 425, and 426, to carry out rapid segmentation on a personal computer. For any given set of rules, not all claims can be segmented reliably. Sometimes one set of rules may conflict with another set of rules. The segmentation engine 42 stores a portfolio of segmentation rules 421, 422, 423, 424, 425, 426, as shown in FIG. 15. However, at any one time, the input text is processed by a predetermined set of segmentation rules that may include only a subset of the segmentation rules 421, 422, 423, 424, 425, and 426.

After reviewing the output, if the end user 46 feels that a given set of segmentation rules is providing erroneous results, the end user 46 may issue a command to the segmentation engine 42 to use a different set of segmentation rules. For example, as illustrated in FIG. 15, the user may command the segmentation engine 42 to use rules 2, 5, and 6, numbered 422, 425, and 426, respectively, instead of the default set of rules consisting of rules 4, 5, and 6, numbered 424, 425, and 426, respectively.

Figure 16:
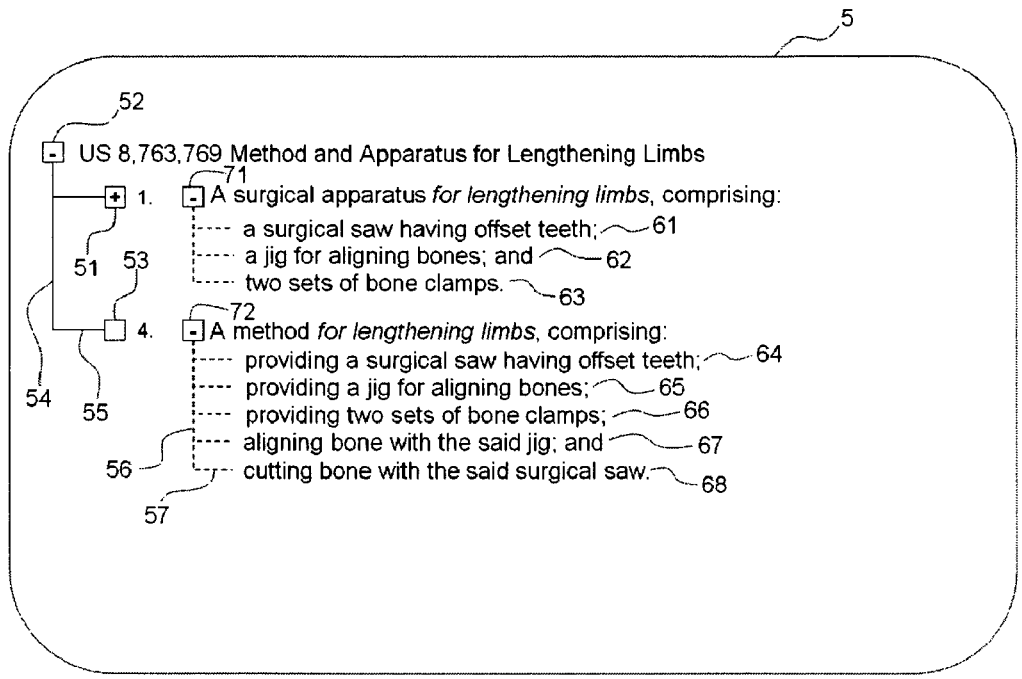
FIGS. 16-20 correspond to FIGS. 10-14 and represent an alternative method of displaying the segmented text on a computer screen.

In one alternative embodiment of the invention, the icons listed in FIG. 9 need not be used; instead three types of node symbols 51, 52, 53 are used to indicate the expandability of text at lower hierarchal level, as depicted in FIG. 16. The intent of these node symbols is to allow the end user 46 to manipulate the displayed level of the segments or claims. The expandable node symbol 51 on a computer screen 5 indicates that when the computer mouse is clicked with the display cursor on or near the expandable node symbol 51, a command will be issued to the display engine 44 to reveal hidden text at the next lower hierarchal level. The compressible node symbol 52 on the computer screen 5 indicates that when the computer mouse is clicked with the display cursor on or near the compressible node symbol 52, a command will be issued to the display engine 44 to hide all text at all lower hierarchal levels. The third node symbol is the neutral node symbol 53, which indicate that there is no text at a lower hierarchal level to hide or unhide.

Each claim is preceded by one of the three node symbols 51, 52, 53 followed by the claim number. The dependency relationship between 2 claims is indicated by a dependency connector that connects the node symbol 51 or 52 of the base claim to the node symbol 51, 52, or 53 of the claim that is dependent from it. The dependency connector includes a vertical connector line 54 and a horizontal connector line 55 extending to the right from the vertical connector line 54 to indicate a dependency relationship.

Figure 18:
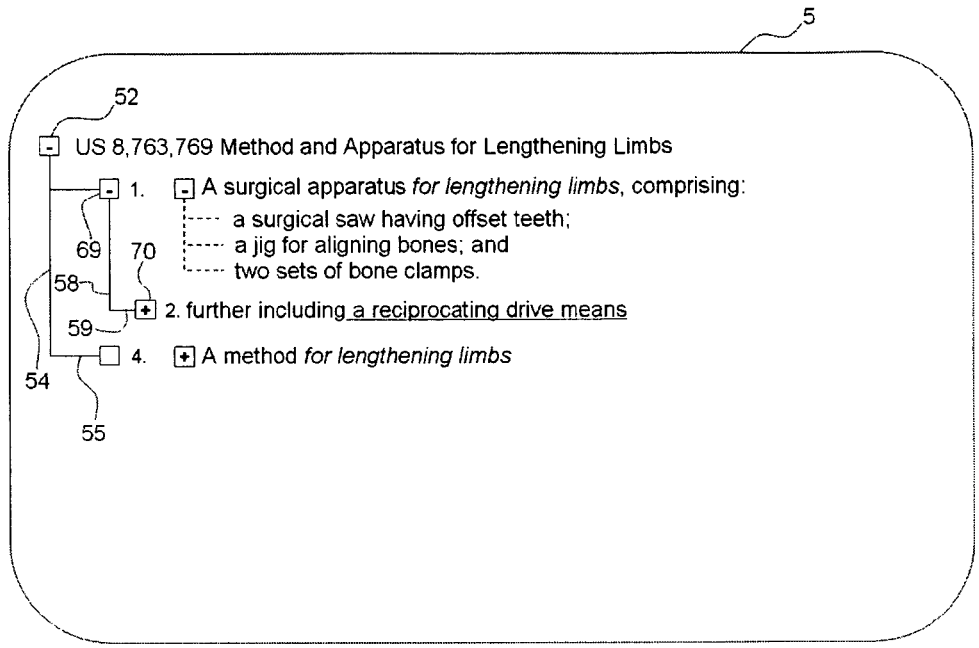

The dependency connectors can be viewed as a highly contracted representation of the preamble phrase of the dependent claim. By way of example, FIG. 18 shows claim 2 to be dependent on claim 1, as indicated by a dependency connector made up of a vertical connector line 58 and a horizontal connector line 59. In accordance with the method of this invention the preamble phrase "A surgical apparatus for lengthening limbs in accordance with claim 1" is represented by the dependency connector, i.e., by the vertical connector line 58 and the horizontal connector line 59.

The dependency connector is a symbolic representation of the text it replaces. The dependency connector further represents the meaning of the text it replaces (i.e., the preamble phrase) because it indicates the dependency relationship. Usage of the dependency connector thus allows for rapid visual interpretation of the content and structure of the claims. A "visual indicator" is a visual structure such as a symbol, font differentiation, punctuation, a change in shape and/or color of a cursor, etc. that may be used to provide information about displayed text, such as the hierarchical level of the text, the presence of proximate hidden text, or the fact that the text can be selected to hide the text or perform other operations. Thus, the node symbols 51, 52, 53, described previously are examples of visual indicators.

In accordance with the method of this invention, a complete claim tree structure can be constructed for any claim text. Another novel aspect of the invention is the representation of elements within a single claim as a tree structure. Each of the independent claims has one or more elements or steps and each of the elements or steps, themselves, may include one or more sub-elements or additional steps. Thus, at any given node level, the method according to this invention allows for the creation of a separate hierarchal set of nodes. In other words, the claim tree can accommodate a separate tree structure in any one of the nodes, thereby providing a "nested tree," or tree structure within a tree structure.

In accordance with the present invention, claim 1 has element phrases 61, 62, 63 and claim 2 has element phrases 64, 65, 66, 67, 68 displayed on the computer screen 5 in an indented position, as shown in FIG. 16. Node symbols 71, 72 precede preamble phrases or title phrases of claims 1 and 2. The node symbols 71, 72 allow the end user 46 to manipulate the level of display of the elements or sub-elements as desired by the end user 46.

A sub-connector consisting of a vertical connector line 56 and a horizontal connector line 57 connects the compressible node symbol 72 to the element phrase 68. The vertical and horizontal connector lines 56, 57 of the sub-connecters can optionally be represented by broken lines to distinguish them from the dependency connectors described previously. Other connectors connect the same compressible node symbol 72 to the other element phrases 64-67 of claim 2. In general, each dependency connector or sub-connector connects one node to another within its own hierarchy. In the case of sub-connectors, where an element does not have sub-elements, the sub-connector connects to a neutral node symbol 53 preceding the element phrase. The method of this invention also allows for the neutral node symbol 53 to be optionally omitted in the case where the element is terminal.

Figure 17:
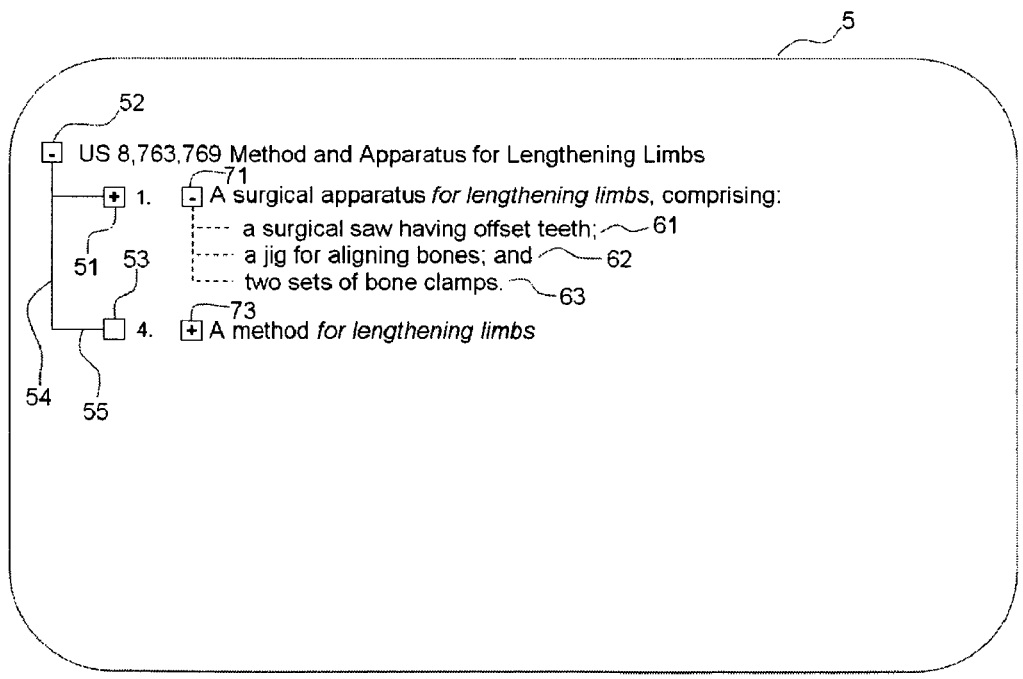

When the display cursor is on or near the compressible node symbol 72 and the end user clicks the mouse, a command is issued to the display engine 44 to hide the element phrases 64, 65, 66, 67, 68 and to replace the compressible node symbol 72 with an expandable node symbol 73 as depicted in FIG. 17. When the display cursor is on or near the expandable node symbol 51 and the end user clicks the mouse, a command is issued to the display engine 44 to display all claims that are directly dependent on claim 1 and to replace the expandable node symbol 51 with a compressible node symbol 69 as depicted in FIG. 18.

In accordance with this alternative embodiment, the dependent transitional phrase "further including" is displayed together with the elemental phrase "a reciprocating drive means." As depicted in FIG. 18 the elemental phrase "a reciprocating drive means" is underlined to indicate that when this elemental phrase "a reciprocating drive means" is clicked with a computer mouse, a command is issued to the display engine 44 to display the associated attribute phrase "for driving the said surgical saw." The attribute phrase is displayed in italic font to provide a visual cue to the end user 46 that this segment can be hidden with the appropriate command. The italic font is one example of a "visual indicator," as defined previously.

The display engine 44 can be encoded with truncation rules to deal with long attribute phrases. By way of example, a truncation rule states that any attribute phrase containing more than five words will be truncated at the sixth word and replaced by a series of 3 periods. The end user 46 may have the option of displaying the full text of the attribute phrase by clicking the cursor on or near the series of three dots. For the purpose of illustration, consider the hypothetical attribute phrase "for driving the said surgical saw at an angle substantially aligned with the long axis of the bone." This lengthy attribute phrase can be truncated to "for driving the said surgical saw . . . " The display engine has the flexibility to allow the end user to choose the length of text for truncation and to choose when to display the full text. The 3 periods provide one example of a "visual indicator," as defined previously.

Figure 19:
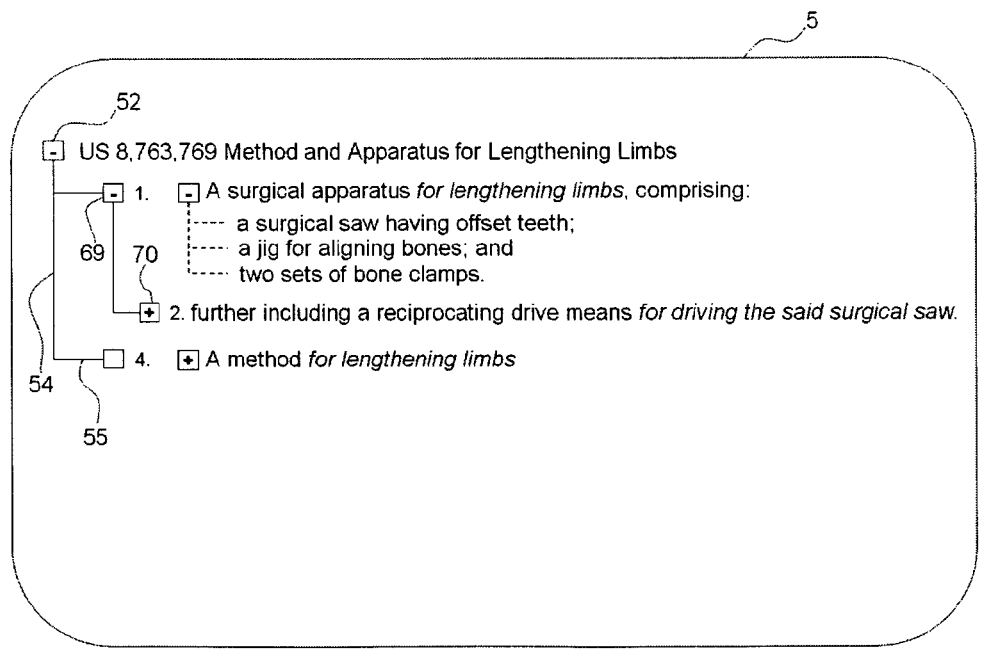
Figure 20:
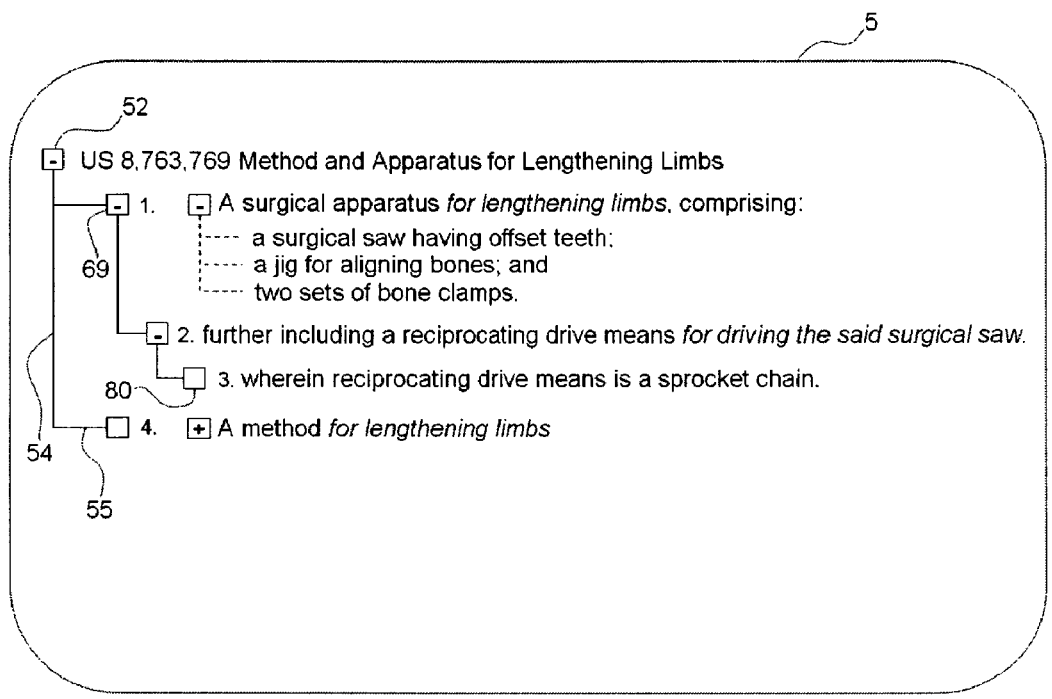

When the display cursor is on or near the expandable node symbol 70 of claim 2 in FIG. 19 and the end user 46 clicks the mouse, a command is issued to the display engine 44 to display all claims that are directly dependent to claim 2. As shown in FIG. 20, the expandable node symbol 70 is replaced with a compressible node symbol such as the compressible node symbol 69 adjacent to claim 1. Claim 3 is displayed as dependent to claim 2 without the need to show the preamble phrase of claim 3. A neutral node symbol 80 is shown directly in front of claim 3. FIG. 20 shows that the dependent transitional phrase "wherein" is displayed together with the body phrase "reciprocating drive means is a sprocket chain."

The method according to this invention allows for the end user 46 to initiate item-by-item compression and decompression of segments and claims for the purpose of display on a computer screen or other output device connected to a computer. In accordance with one provision of the present invention, the end user 46 may cause the display engine 44 to hide or unhide a group of items such as attribute phrases or dependent claims at the same time. Such an action may be performed by clicking on an icon (not shown) or menu bar item (not shown) on the computer screen. For example, the end user 46 may elect to show or hide all dependent claims, attribute phrases, or other segments throughout all of the patent claims from the patent document.

In this application, a "patent document" may be published or issued by the U.S.P.T.O. or a patent office outside the U.S. A "patent document" may even be an unfiled application that is to be checked or analyzed prior to filing through the use of the system and method provided herein.

Yet another provision of the present invention enables the full text of a particular claim to be displayed when the claim is selectively focused. The full text can be displayed on a preview panel or other graphical object on the computer screen.

Still another optional provision of the present invention is the ability of the display engine 44 to search the full text of the specification to locate and display each occurrence of a group of words in the displayed claim tree. As the specification serves as a glossary for specific terms used in the claim language, the ability to cross reference the claims with the description on demand will greatly enhance the speed and depth of claim language comprehension.

According to another optional feature, several sets of compressed claims from different patents may simultaneously be displayed on a single computer screen for analysis and comparison. The user selectable compression and decompression of various part of the claim set, as described above, allows for rapid and accurate analysis.

The present invention may be embodied in other specific forms without departing from its spirit or essential characteristics. It is appreciated that various features of the system and method set forth above can be mixed and matched to form a variety of other alternatives. As such the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer readable medium containing computer code comprising a system for segmenting one or more claims from a patent document, the system comprising:
 a display device;
 a segmentation engine configured to receive text from the patent document, the text comprising a preamble and at least one substantive claim limitation, wherein the at least one substantive claim limitation recites a limitation to an invention, wherein the segmentation engine is further configured to segment the claims into at least one element phrase;
 wherein the segmentation engine is further configured to segment the at least one element phrase into at least one elemental phrase and at least one attribute phrase, wherein the at least one attribute phrase comprises the at least one substantive claim limitation;
 wherein the segmentation engine is further configured to identify an opening and a closing of the at least one substantive claim limitation to extract the at least one substantive claim limitation from a remainder of the text; and
 a display engine configured to receive a first segment comprising the preamble and a second segment comprising the at least one substantive claim limitation and to display the at least one substantive claim limitation in a position indicating hierarchical subordination to the preamble.

2. The computer readable medium of claim 1, wherein the segmentation engine is further configured to store the at least one substantive claim limitation with an opening tag positioned at the opening and a closing tag positioned at the closing; and
 wherein the segmentation engine is further configured to segment the preamble into a title phrase and an attribute phrase.

3. The computer readable medium of claim 1, wherein the segmentation engine is further configured to identify a transitional phrase preceding the at least one substantive claim limitation within the text to identify the opening; and
 wherein the segmentation engine is further configured to segment a body phrase into at least one relational phrase, wherein the at least one relational phrase comprises at least two antecedent elements;
 wherein the at least one relational phrase uses prepositions to indicate a spatial or temporal relationship between the at least two antecedent elements.

4. The computer readable medium of claim 3, wherein the segmentation engine is further configured to identify a punctuation mark following the at least one substantive claim limitation within the text to identify the closing.

5. The computer readable medium of claim 1, wherein the segmentation engine is further configured to classify the at least one substantive claim limitation to indicate whether the at least one substantive claim limitation provides an additional element of the invention claimed by the one or more claims, or restricts an existing element previously recited by the one or more claims.

6. The computer readable medium of claim 1, wherein the segmentation engine is further configured to classify each claim of the one or more claims to indicate whether each claim is independent or dependent, and to indicate which claim each dependent claim depends from.

7. The computer readable medium of claim 1, further comprising a display engine configured to receive a first segment comprising the at least one substantive claim limitation and a second segment comprising the remainder of the text and to carry out one of displaying and hiding each of the first and second segments, according to at least one user-adjustable display setting, wherein the display engine is capable of displaying the segments independently of each other.

8. A computer readable medium containing computer code comprising a system for segmenting claims from a patent document, the system comprising:
 a display device;
 a segmentation engine configured to receive the claims from the patent document and to divide the claims to provide a plurality of segments, each of which consist of at least one substantive claim limitation,
 wherein said at least one substantive claim limitation recites a limitation to an invention;
 wherein the segmentation engine is further configured to segment the claims into at least one element phrase;
 wherein the segmentation engine is further configured to segment the at least one element phrase into at least one elemental phrase and at least one attribute phrase, wherein the at least one attribute phrase comprises the at least one substantive claim limitation; and
 a display engine configured to receive the segments and to carry out one of displaying and hiding each of the segments, according to at least one user-adjustable display setting;
 wherein the display engine is capable of displaying each of the segments independently of the other segments.

9. The computer readable medium of claim 8, wherein the at least one user-adjustable display setting comprises a setting that causes the display engine to display all independent claims within the claims, and to hide all dependent claims within the claims.

10. The computer readable medium of claim 8, wherein the at least one user-adjustable display setting comprises a setting that causes the display engine to display or hide each segment of the plurality of segments that comprises the at least one substantive claim limitation of the claims, and to hide or display each segment of the plurality of segments that comprises at least a portion of a preamble or a transitional phrase of the claims.

11. The computer readable medium of claim 8, wherein the display engine is further configured to display a symbolic representation in place of at least one of the segments of the plurality of segments.

12. The computer readable medium of claim 11, wherein the display engine is further configured to display a visual indicator that indicates a presence of a hidden segment of the plurality of segments, wherein the visual indicator is selected from the group consisting of a symbol, a second font different from a first font used to display one or more unhidden segments of the plurality of segments, a change in a shape or color of a display cursor to indicate one or more hidden segments proximate the display cursor, and one or more characters displayed in place of the hidden segment.

13. A computer readable medium containing computer code comprising a system for segmenting claims from a patent document, the system comprising:
 a display device;
 a segmentation engine configured to extract and receive text from the patent document, the text comprising the claims, wherein the segmentation engine is further configured to divide the text into segments, each of which comprises only one of the claims, and to further divide at least one of the segments into subsegments;

wherein the segmentation engine is further configured to segment the subsegments into at least one element phrase;

wherein the segmentation engine is further configured to segment the at least one element phrase into at least one elemental phrase and at least one attribute phrase, wherein the at least one attribute phrase consists of at least one substantive claim limitation, wherein said substantive claim limitation recites a limitation to the invention; and a display engine configured to receive the extracted segments, subsegments and the element phrase, and to display the extracted segments according to a first hierarchal format that indicates a first relationship between the segments and to display the subsegments according to a second hierarchical format that indicates a second relationship between the subsegments and at least one of the segments.

14. The computer readable medium of claim 13, wherein the first relationship comprises a dependency of one of the first and second claims on the other of the first and second claims; and wherein the segmentation engine is further configured to segment the preamble into a title phrase and an attribute phrase.

15. The computer readable medium of claim 14, wherein the second relationship comprises a status of each subsegment as the substantive limitation of any of the claims.

16. The system of claim 15, wherein the first hierarchical format comprises a first tree structure and the second hierarchical format comprises a second tree structure nested within the first tree structure.

17. A method for segmenting one or more claims from a patent document, the method comprising:

receiving text from the patent document, the text comprising a preamble and at least one substantive claim limitation, wherein said at least one first substantive claim limitation recites a limitation to an invention;

segmenting the preamble into at least one title phrase and at least one attribute phrase, wherein the attribute phrase comprises at least one second substantive claim limitation;

identifying an opening and a closing of the at least one first substantive claim limitation to extract the substantive claim limitation from a remainder of the text; and displaying the preamble and the at least one first substantive claim limitation in a position indicating hierarchical subordination to the preamble.

18. The method of claim 17, wherein identifying the opening and the closing further comprises storing the at least one first substantive claim limitation with an opening tag positioned at the opening and a closing tag positioned at the closing.

19. The method of claim 17, wherein the identifying the opening comprises identifying a transitional phrase preceding the at least one first substantive claim limitation within the text.

20. The method of claim 19, wherein identifying the closing comprises identifying a punctuation mark following the at least one first substantive claim limitation within the text.

21. The method of claim 17, further comprising classifying the at least one first substantive claim limitation to indicate whether the at least one first substantive claim limitation provides an additional element of an invention claimed by the one or more claims, or restricts an existing element previously recited by the one or more claims.

22. The method of claim 17, further comprising classifying each claim of the one or more claims to indicate whether each claim is independent or dependent, and to indicate which claim each dependent claim depends from.

23. The method of claim 17, further comprising one of displaying and hiding each of the segments independently of each other, according to at least one user-adjustable display setting.

24. The method of claim 23, further comprising displaying a symbolic representation in place of at least one hidden segment to indicate a meaning of the hidden segment.

25. The method of claim 24, wherein displaying the symbolic representation comprises:

displaying a vertical line terminating proximate a base claim of the one or more claims, wherein the hidden segment comprises at least a portion of a dependent claim that depends from the base claim; and displaying a horizontal line extending between the vertical line and a position proximate at least a portion of the dependent claim.

26. A computer readable medium containing executable code for carrying out a method comprising:

receiving text from the patent document, the text comprising a preamble and at least one substantive claim limitation, said at least one first substantive claim limitation recites a limitation to an invention;

segmenting the preamble into at least one title phrase and at least one attribute phrase, wherein the attribute phrase comprises at least one second substantive claim limitation; and identifying an opening and a closing of the at least one substantive claim limitation to extract the substantive claim limitation from a remainder of the text; and displaying the preamble and the at least one first substantive claim limitation in a position indicating hierarchical subordination to the preamble.

27. The computer readable medium of claim 26, wherein identifying the opening and the closing further comprises storing the at least one first substantive claim limitation with an opening tag positioned at the opening and a closing tag positioned at the closing.

28. The computer readable medium of claim 26, wherein the identifying the opening comprises identifying a transitional phrase preceding the at least one first substantive claim limitation within the text.

29. The computer readable medium of claim 28, wherein identifying the closing comprises identifying a punctuation mark following the at least one first substantive claim limitation within the text.

30. The computer readable medium of claim 26, further comprising classifying the at least one first substantive claim limitation to indicate whether the at least one first substantive claim limitation provides an additional element of the invention claimed by the one or more claims, or restricts an existing element previously recited by the one or more claims.

31. The computer readable medium of claim 26, further comprising classifying each claim of the one or more claims to indicate whether each claim is independent or dependent, and to indicate which claim each dependent claim depends from.

32. The computer readable medium of claim 26, further comprising one of displaying and hiding each of the segments independently of each other, according to at least one user-adjustable display setting.

* * * * *